Nov. 5, 1968 B. ROSS 3,409,797

IMAGE TRANSDUCING DEVICE

Filed April 26, 1966

BERND ROSS
INVENTOR.

BY Lyon & Lyon

ATTORNEYS

United States Patent Office
3,409,797
Patented Nov. 5, 1968

3,409,797

IMAGE TRANSDUCING DEVICE

Bernd Ross, Arcadia, Calif., assignor, by mesne assignments, to Globe-Union Inc., Milwaukee, Wis., a corporation of Delaware Filed Apr. 26, 1966, Ser. No. 545,339
4 Claims. (Cl. 315—10)

ABSTRACT OF THE DISCLOSURE

An image transducing device, including among other elements a sensing device and scanning means, for translating an image into electrical signals. The sensing device comprises a semiconductor wafer of a first conductivity having on one face of the wafer a great number of photo diodes which are areas or islands of a second conductivity separated from the wafer by a PN junction and having conductor means on another face of the wafer. The photo diodes or islands are formed in a predetermined relationship to one another and overall may be formed in a pattern which is a function of indicia to be sensed. The scanning means and conductor means develop a signal dependent upon the light intensity on the photo diodes.

Figure 1:
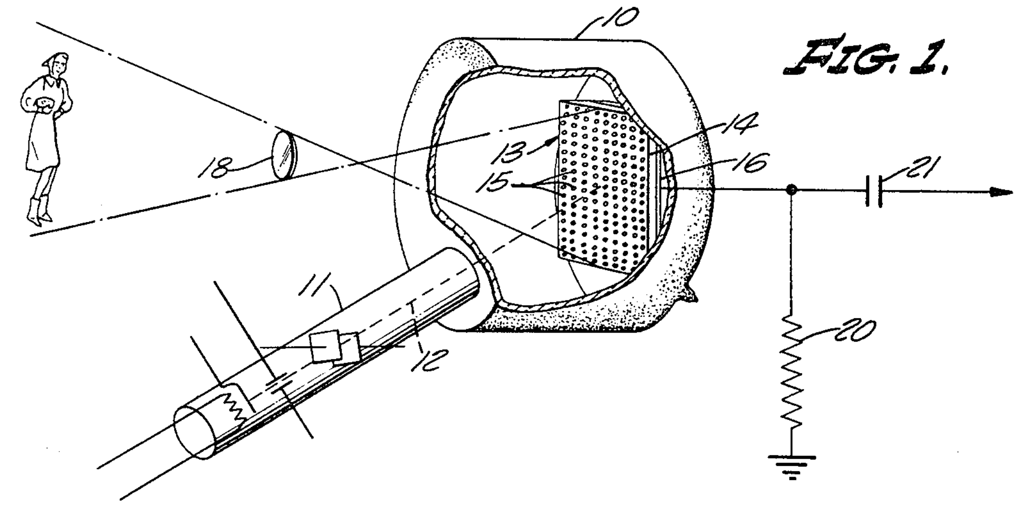

This invention relates to an image transducing device and more particularly to such devices employing a photosensitive mosaic or matrix for translating images into electrical signals.

Devices for translating images into electrical signals, such as well-known pickup camera tubes used in the television art are known. These camera tubes include the iconoscope, image orthicon and vidicon. The present invention relates to image translating devices of the nature of an iconoscope.

The iconoscope, for example, essentially includes a glass tube somewhat like a television picture tube in appearance, but with the neck of the tube displaced from the central axis thereof. Light from an object or scene is collected by a lens and focused inside the tube onto a photoconductive mosaic, similar to a photocell but including millions of tiny individual dots each responsive to light waves. Typically, the mosaic is coupled with a signal plate. The details of the object or scene in black, white and shades of gray appear in electrical form on the mosaic which transfers the image to the signal plate. Thus, a light image is converted to millions of electrical signals, and these signals essentially are collected by a scanning electron beam. An electron gun is housed in the neck of the tube, and this gun emits the electron beam toward the mosaic. As the beam strikes a dot on the mosaic, a current exists in the signal plate resulting in a current pulse representing a picture signal. The beam is moved in an ordered fashion at high speed over the entire mosaic thereby producing a series of electrical pulses, each corresponding to the light intensity at a point in the original object or scene. These pulses are detected and along with synchronizing pulses are transferred to receiving equipment, such as a television monitor or set, by means of cables or a transmitter.

Because of the desire for more sensitive cameras and cameras having better resolution, the iconoscope has been replaced in many applications by the image orthicon and vidicon. The vidicon typically uses a transparent electrode coated with a layer of photoconductive material. This layer, which is called the "target," varies in resistance in proportion to the amount of light falling upon it. When the beam emitted from the cathode strikes the target material, the brilliantly illuminated portions offer less resistance and pass the electrons more readily than do the dark areas. A voltage applied to the target electrode drains these electrons through a resistor, causing a signal to be developed.

It is an object of the present invention to provide an improved high resolution image transducing device for translating images into electrical signals.

It is an additional object of this invention to provide an improved high resolution image transducing device capable of translating images into electrical signals and which is sensitive in the visible and infrared wavelength ranges.

A further object of the invention is to proivde an improved image transducing device for translating an image into electrical signals employing a semiconductor photovoltaic matrix with an electron beam serving as one contact thereof.

Another object of this invention is to provide a semiconductor device for converting images to electrical signals and having a plurality of PN junctions arranged in the form of a matrix.

A further object of the present invention is to provide an image transducing device utilizing a photo diode matrix including a material having a plurality of P-N junctions therein, with an electron beam serving as one contact for said matrix.

These and other objects of this invention will become more apparent upon a consideration of the following description taken in conjunction with the drawing in which:

FIGURE 1 is a perspective view, partially cut-away, of an image translating device in accordance with the concepts of the present invention; and FIGURES 2 through 7 illustrate the manner in which a matrix according to the invention is constructed.

According to an embodiment of the present invention an image translating device for translating images into electrical signals is provided and employs a photosensitive semiconductor matrix. The matrix includes a plurality, such as one million, of opposite conductivity type dots or islands forming P-N junctions with a semiconductor plate or wafer. Each of the islands along with the wafer serves as a photo diode and may be extremely small, such as ten microns square or in diameter. A first contact is connected to the semiconductor wafer and a second contact is provided for each island by a steered or scanned electron beam.

Referring now to FIGURE 1, an image transducing device according to the invention is shown. The device includes a conventional glass tube 10, similar to an iconoscope, having a neck 11. Within the neck 11 are supported conventional electrodes for generating, accelerating and scanning an electron beam 12. A matrix, generally designated 13 is supported within the tube 10. The matrix 13 includes a semiconductor wafer 14, a plurality of opposite conductivity type dots or islands 15 on the front thereof, and an electrode 16 on the back surface thereof.

The matrix 13 is positioned within the tube with the front surface thereof arranged to receive an image through a conventional lens system generally designated by a reference numeral 18. As the electron beam 12 scans the islands 15, electrical signals which are dependent upon the light intensity at the islands are generated across a resistance 20 connected between the electrode 16 and ground. The signals developed across the resistance 20 are coupled through a coupling capacitor 21 to an output terminal to provide pulses corresponding to the received image as the electron beam 12 scans the islands 15. These pulses may be detected and used along with synchronizing pulses for the electron beam in a conventional manner to transfer image information to a receiving device such as a television monitor or set.

Figures 2, 3, 4, 5, 6, 7:
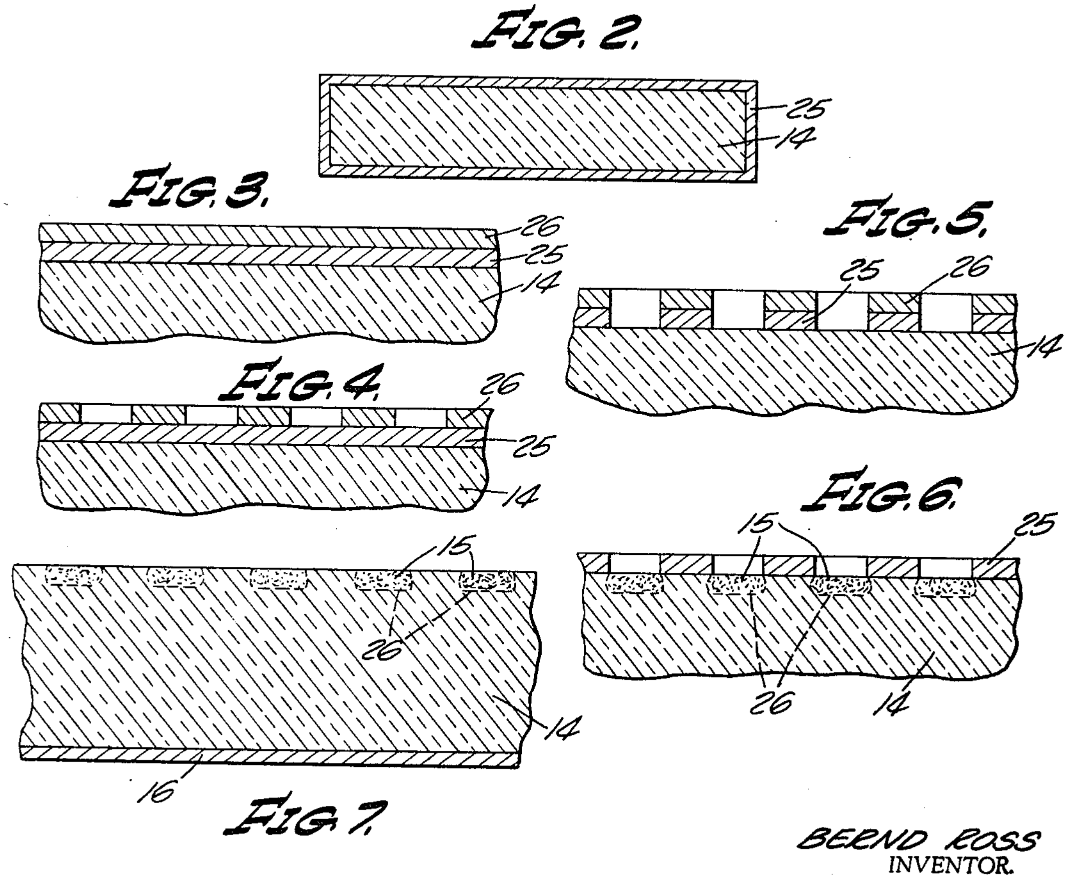

The matrix 13 may be fabricated using conventional techniques well-known in the art of manufacturing photovoltaic devices. Because of the accuracy in size and spacing of the islands 15 needed for a high resolution image transducing device, preferably photoetching or photolithography techniques are employed. As an example, a silicon wafer 14 of from approximately .05 to 10 ohms per centimeter is oxidized to provide a silicon oxide coating 25 thereon as shown in FIGURE 2. A photoresist 26 is applied over the oxide coating on top of the wafer as shown in FIGURE 3. The photoresist is then masked, exposed and developed to leave a pattern of open regions in the resist as shown in FIGURE 4 thereby exposing underlying portions of the silicon oxide 25 in the pattern of desired islands. The exposure of the photoresist may be accomplished with an electron beam raster system similar to that used in commercial color kinescope manufacture, if desired. The exposed silicon oxide 25 is etched away as shown in FIGURE 5 thereby exposing corresponding portions of the underlying silicon wafer 14, following which the photoresist is removed.

An impurity, such as phosphorus, is diffused into the exposed portions of the silicon wafer 14 as shown in FIGURE 6 to provide the islands 15 thereby forming P-N junctions 26. An electrode 16 is applied to the back surface of the wafer 14 as shown in FIGURE 7, and this may be a nickel plating on the entire back surface. The thickness of the diffusion layer forming the islands 15 preferably is small, such as two-tenths to five-tenths micron. Additionally, the diffusion length, that is the distance within the wafer between the islands, preferably is relatively small, such as ten microns. It will be understood that the principles of the invention are equally applicable to an N-diffused P-type matrix or a P-diffused N-type matrix. The term photovoltaic matrix is used in the specification and claims to designate either an N on P or P on N type matrix.

It will be apparent that a matrix of opposite conductivity type islands 15 on a semiconductor wafer 14 is provided. Each of these islands 15 in combination with the wafer 14 represents a photo diode, and each may be relatively small, for example ten microns by ten microns square or ten microns in diameter. It further will be apparent that metallic front contacts to each of the islands or diodes is impractical because of their small size. Accordingly, the function of front contacts is provided by the electron beam 12.

Conventional raster scanning circuitry (not shown) is coupled with the gun electrodes in the neck 11 of the tube 10 to cause the electron beam to scan the front surface of the matrix 13 to strike the islands 15 in a conventional raster pattern, i.e., row by row and sequentially within each row. Each of the photo diodes is capable of developing an electrical signal across the P-N junction thereof depending upon the intensity of the light striking the junction. When an individual island is struck by the electron beam 12, a signal is developed in the output circuit coupled to the electrode 16 proportional to the intensity of the light striking the P-N junction. This signal, when synchronized with the position of the electron beam 12 according to conventional iconoscope techniques, represents the intensity of the light striking the junction in an electrical form. Thus, by scanning the islands 15 with the electron beam 12 a series of electrical signals are produced, each corresponding to the light intensity at a point in the original object or scene. These signals may be detected or conditioned in a conventional manner and transferred to receiving equipment.

In the case of an N on P type matrix each junction functions as a photovoltaic device and a voltage is generated across the junction proportional to light intensity. In the case of a P on N type matrix each junction acts as a reversed biased junction and current therethrough varies as a function of light intensity. In the former case, an N on P type matrix, a screen grid (not shown) may be used in front of the matrix if desired to reduce the energy of the electron beam to reduce or prevent the release of electron-hole pairs from the matrix.

For a resolution of one thousand lines per frame (present resolution typically is five hundred and twenty-five lines per frame) in an iconoscope type device, one million islands 15 approximately ten times ten micron square, or ten microns in diameter, may be provided having a ten micron spacing therebetween in a matrix having an overall size of approximately two centimeters by two centimeters. The capacitance per photo diode is approximately $10^{-8}$ microfarad. However, the value of this capacitance depends on whether the diode is operated in the forward or reverse direction. In the forward direction, the capacitance varies directly with the current through the diode; whereas in the reverse direction it varies approximately as the square root of the voltage across the diode. A typical writing speed may be approximately ten million centimeters per second or ten thousand frames per second.

The peak response for a silicon wafer is at approximately 8500 Angstroms and depends on the semiconductor material used, and this may be shifted up or down generally at the expense of signal amplitude. For sensing in other than the visible spectrum or for obtaining a desired response characteristic, a different semiconductor material or a different junction depth, or both, may be used. The peak response may be shifted down, for example, by degrading the bulk material, i.e., the wafer 14.

The response may be shifted into the near infrared range for use in infrared image conversion by diffusion alteration or the use of a selective filter coating. Alternatively, a wafer of, for example, indium antimonide with plural PN junctions may be used for sensing long wavelengths inasmuch as indium antimonide has a small energy gap, i.e., about one-tenth of that of silicon. In order to accurately sense infrared energy the matrix is cooled. This can be done by mounting the matrix on a stud which extends outside the tube 10 with the exterior end of the stud being cooled, as by a cooling bath. The coefficient of thermal expansion of the stud should be close to that of the matrix. Alternatively, the matrix may be thermoelectrically cooled rather than employing a stud.

The concepts of the present invention also may be used in indicia sensing or character recognition systems. The matrix may be fabricated as a field or pattern of islands or photo diodes of a desired shape or shapes. A load circuit can be activated, for example, if an illuminated portion of the matrix matches the shape of the field or photo active portion of the matrix.

The present embodiment of the invention is to be considered in all respects as illustrative and not restrictive, the scope of the invention being indicated by the appended claims rather than by the foregoing description, and all changes which come within the meaning and range of equivalency of the claims therefore are intended to be embraced therein.

What is claimed is:

1. An indicia sensing device comprising:

a matrix including a semiconductor wafer of a first conductivity type material and a plurality of islands of a second conductivity type material forming a like plurality of PN junctions with said wafer, said plurality of islands being formed in a distinct predetermined pattern having a configuration which is a function of indicia to be sensed; and means for directing electrons at said islands.

2. A device as in claim 1 wherein:

the distinct predetermined pattern of said islands is a function of at least one character;

a back surface of said wafer has a metallic contact thereon; and circuit means coupled with said metallic contact and adapted to provide a signal when radiant energy reaching said islands substantially corresponds to the pattern of said islands.

3. A device as in claim 2 wherein the distinct predetermined pattern has a configuration complementing the shape of said character.

4. A device as in claim 2 wherein the distinct predetermined pattern has a configuration coinciding with the shape of said character.

References Cited

UNITED STATES PATENTS

| | | | |
|---|---|---|---|
| 2,858,246 | 10/1958 | Pearson | 313—66 X |
| 3,252,030 | 5/1966 | Cawein | 313—66 |
| 3,322,955 | 5/1967 | Desvignes | 313—66 X |
| 3,341,857 | 9/1967 | Kabell. | |

RODNEY D. BENNETT, *Primary Examiner.*

J. P. MORRIS, *Assistant Examiner.*